United States Patent [19]

Rokutan

[11] Patent Number: 4,962,301
[45] Date of Patent: Oct. 9, 1990

[54] METHOD OF RECIPROCALLY RECORDING DATA ON CARD-LIKE RECORD MEDIUM FOR UNIDIRECTIONAL READING

[75] Inventor: Takao Rokutan, Tokyo, Japan

[73] Assignee: Olympus Optical Co., Ltd., Japan

[21] Appl. No.: 146,247

[22] Filed: Jan. 20, 1988

[30] Foreign Application Priority Data

Jan. 30, 1987 [JP] Japan .................................. 62-18715

[51] Int. Cl.$^5$ ......................... G06K 1/12; G11B 7/007
[52] U.S. Cl. .................................... 235/487; 235/454; 235/480; 369/59; 346/76 L
[58] Field of Search ............... 235/454, 475, 476, 480, 235/487; 369/59, 32; 400/323, 121; 346/76 L

[56] References Cited

U.S. PATENT DOCUMENTS 4,398,223 8/1983 Lenelson ................................ 369/32
4,463,444 7/1984 Daniels et al. ...................... 400/323
4,811,321 3/1984 Enari et al. ........................... 369/59
4,825,059 4/1989 Kurihara et al. .................... 235/475

FOREIGN PATENT DOCUMENTS 61-242366 10/1986 Japan .

Primary Examiner—Steven L. Stephan
Assistant Examiner—Robert A. Weinhardt
Attorney, Agent, or Firm—Arnold, White & Durkee

[57] ABSTRACT

In a method of recording data on a card-like record medium in which a data recording operation is performed by moving the card-like record medium reciprocally in normal and reverse directions with respect to a recording head, the data recording operation is performed in the manner that the data are recorded in the same order and the same modulation method when viewed from one direction of the relative and reciprocal movement. Therefore, the card-like record medium can be utilized effectively and the data reading apparatus can be made inexpensive in cost.

6 Claims, 4 Drawing Sheets

FIG_1
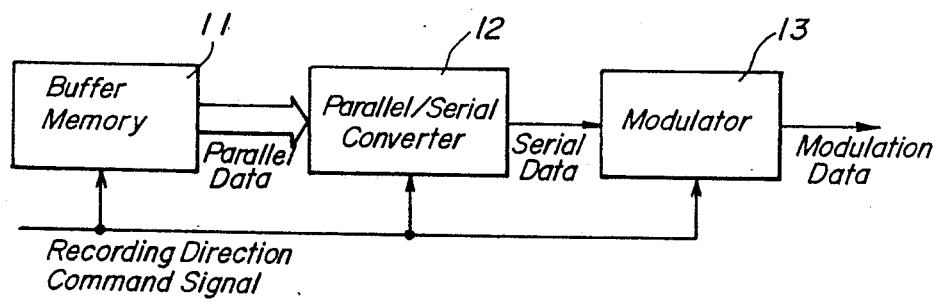
FIG_2A
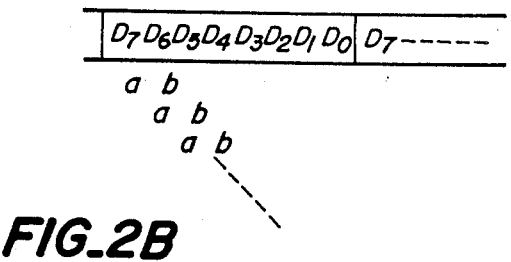
FIG_2B
| a | b | MFM Data | |
|---|---|---|---|
| 0 | 0 | 1 | 0 |
| 0 | 1 | 0 | 1 |
| 1 | 0 | 0 | 0 |
| 1 | 1 | 0 | 1 |

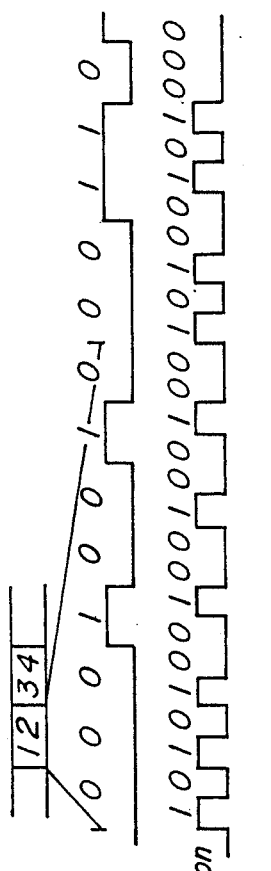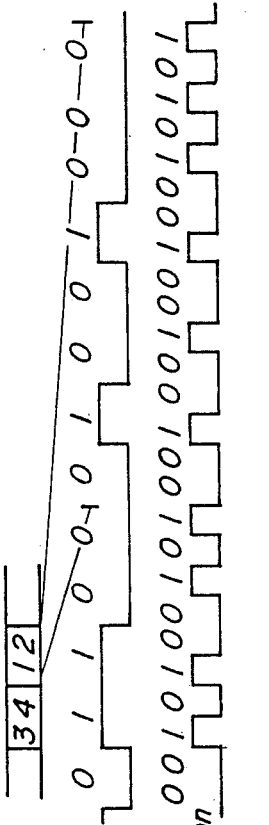

| a | b | MFM Data | |
|---|---|---|---|
| 0 | 0 | 0 | 1 |
| 0 | 1 | 0 | 0 |
| 1 | 0 | 1 | 0 |
| 1 | 1 | 1 | 0 |

Normal Direction

Reverse Direction

METHOD OF RECIPROCALLY RECORDING DATA ON CARD-LIKE RECORD MEDIUM FOR UNIDIRECTIONAL READING

BACKGROUND OF THE INVENTION

1. Field of the Invention

The present invention relates to a method of recording data on a card-like record medium such as an optical card and a magnetic card.

2. Prior Art

As for the card-like record medium, the magnetic card and the optical card are known. Since these record mediums are portable, the magnetic card is widely used for a credit card and a prepaid card, and the optical card having larger storage than that of the magnetic card is expected to be used for a bank card and a portable map.

The optical card disclosed in for example PCT/US82/00187 has a large storage as mentioned above. Therefore, when the data are recorded on a plurality of tracks successively, a recording operation is performed by moving the optical card and a recording head relatively and reciprocally.

In this case, a time required for recording the data is shortened as compared with a one-way recording operation. However, as shown in FIGS. 7A and 7B in which for example the data recording operation is performed by moving an optical card 1 reciprocally with respect to a recording head 2, if the data recording operation is performed in both directions i.e. a normal direction shown in FIG. 7A and a reverse direction shown in FIG. 7B in such a manner that the data are recorded on respective tracks 3 in the same direction and same modulation method, the data recording direction is varied track by track. In this case, if a data reading operation is performed in only one direction as usual, the data cannot be readout accurately.

To eliminate the drawback mentioned above, as shown in FIG. 8, it is possible to read the data by utilizing flags 5 and 6 arranged in top and bottom portions of data block 4 and representing the recording direction of the data block 4. However, in this method, since it is necessary to use regions for recording the flags 5 and 6, an amount of recordable data in respective tracks 3 is decreased. Moreover, since it is necessary to use a circuit for recording the flags 5 and 6 and a circuit for detecting the flags 5 and 6 on the reading operation, a device becomes expensive in cost. Further, if the flags 5 and 6 are not detected accurately due to a defect of the optical card such as a flaw or an adhesion of dust to the optical card, all the data in the data block 4 which occurs the reading error cannot be readout at all.

SUMMARY OF THE INVENTION

The present invention has for its object to eliminate the drawbacks mentioned above and to provide a method of recording data on a card-like record medium which can read the data always accurately in regardless of the data recording direction.

According to the invention, a method of recording data on a card-like record medium in which a data recording operation is performed by moving the card-like record medium reciprocally in normal and reverse directions with respect to a recording head, comprises the steps of recording data in a predetermined one of normal and reverse directions and in accordance with a predetermined modulation method during the movement in said predetermined direction, and recording data in the other direction in such a manner that the recorded data have the same data recording direction and modulation method as those of the predetermined direction if the data are readout from the same direction as that of the predetermined direction.

That is to say, in the present invention, the card-like record medium is moved reciprocally with respect to the recording head, and the recording operation is performed in bi-direction. Here, it is assumed that one direction is normal and the other direction is reverse. In the data recording operation in the normal direction, after parallel data to be recorded are converted into serial data and modulated by a predetermined modulation method, the modulated data are recorded on the card-like record medium. Moreover, in the data recording operation in the reverse direction, if the data are detected as those to be recorded in the reverse direction, the parallel data are converted into the serial data in such a manner that the recorded data are to be the same order as that of the normal direction if the data are readout in the same normal direction. Then, the converted data are modulated in such a manner that the recorded data are to be the same modulation as that of the normal direction if the data are readout in the same normal direction, and the converted data are recorded on the card-like record medium.

In this manner, if the data are recorded bidirectionally i.e. in the normal direction and in the reverse direction, all the data recorded on respective tracks have the same order viewed from one direction in regardless of the recording direction. Therefore, it is possible to read the data in regardless of the data recording direction.

BRIEF DESCRIPTION OF THE DRAWINGS

FIG. 1 is a block diagram showing one embodiment of a data recording apparatus for effecting a method according to the invention;

FIG. 2A is a schematic views for explaining a method of modified frequency modulation (MFM), respectively;

FIG. 2B is a schematic view for explaining a method for modified frequency modulation (MFM);

FIG. 3A is a schematic view illustrating the MFM method in the normal direction related to parallel data;

FIG. 3B is a schematic view illustrating the MFM method in the normal direction related to a serial data;

FIG. 3C is a schematic view illustrating the MFM method in the normal direction related to modulation data;

FIG. 4A is a schematic view illustrating the MFM method in the reverse direction related to parallel data;

FIG. 4B is a schematic view illustrating the MFM method in the reverse direction related to serial data;

FIG. 4C is a schematic view illustrating the MFM method in the reverse direction related to modulation data;

DESCRIPTION OF THE PREFERRED EMBODIMENT

FIG. 1 is a block diagram showing one embodiment of a data recording apparatus for effecting a method according to the invention. In this embodiment, a main part of the data recording apparatus comprises a buffer memory 11 for storing data to be recorded, a parallel/serial converter 12 for converting parallel data supplied from the buffer memory 11 in a predetermined order into serial data, and a modulator 13 for modulating the converted serial data. The modulated data are supplied to a recording head not shown which is moved reciprocally and relatively with respect to an optical card to record the data on the optical card in an optical manner. Moreover, the buffer memory 11, the parallel/serial converter 12 and the modulator 13 are controlled by a recording direction command signal outputted from for example a driving portion for moving the optical card reciprocally or a controlling portion of the driving portion.

Figure 7A:
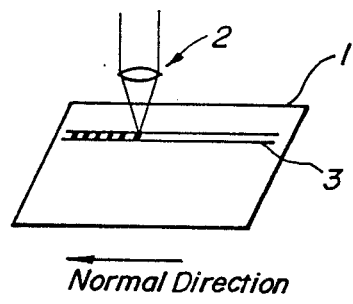
FIG. 7A is a schematic view illustrating a drawback of conventional methods.
Figure 7B:
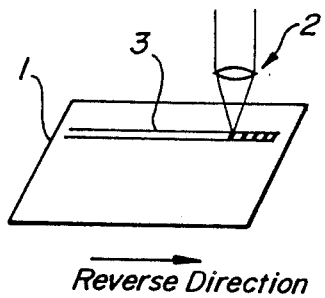
FIG. 7B is a schematic view illustrating a drawback of conventional methods.
Figure 8:
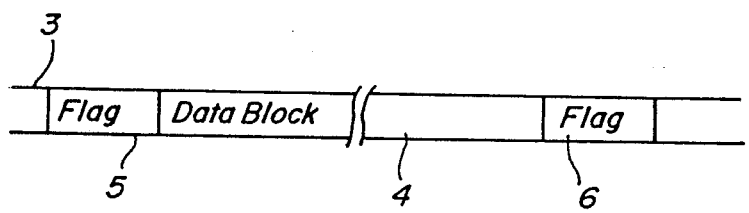
FIG. 8 is a schematic view illustrating a drawback of conventional methods.

Hereinafter, it is assumed that a recording direction shown in FIG. 7A is a normal direction and a recording direction shown in FIG. 7B is a reverse direction, and an operation of the embodiment mentioned above will be explained.

In the recording operation of the normal direction, when the recording direction command signal representing the normal direction is supplied to the buffer memory 11, the buffer memory 11 supplies the data to be recorded in a predetermined order i.e. for example as a parallel data constructed from a top of a data block to the parallel/serial converter 12. In the parallel/serial converter 12, the parallel data are converted successively into serial bit array from for example a most significant bit (MSB), and are supplied to the modulator 13 as a serial data. In the modulator 13, the serial data are modulated by the known various modulation methods such as a frequency modulation method and a modified frequency modulation method, and the modulated data are supplied to a recording head not shown so as to record the data on the optical card.

The recording operation in the normal direction mentioned above is the same as that of the known one for the magnetic disc, the optical disc, etc.

In the recording operation of the reverse direction, when the recording direction command signal representing the reverse direction is supplied to the buffer memory 11, the buffer memory 11 supplies the data to be recorded in the reverse order as that in the normal direction as the parallel data. That is to say, since the data are outputted from the top of the data block in the recording operation of the normal direction, the data are successively outputted from a bottom to the top of the data block in this recording operation of the reverse direction. The parallel data are supplied to the parallel/serial converter 12 and are converted in a reverse manner as that in the normal direction into the serial data. That is to say, since the data are converted from the most significant bit (MSB) in the recording operation of the normal direction, the data are successively converted from the least significant bit (LSB) in the recording operation of the reverse direction into the serial data, and the thus converted serial data are supplied to the modulator 13. In the modulator 13, the serial data are converted successively by the modulation method such that the modulated data have the same order when they are readout along the normal direction. Then, the modulated data are supplied to the recording head and are recorded on the optical card.

Hereinafter, the present invention will be explained in detail in the case that the modified frequency modulation (MFM) is performed.

The modified frequency modulation is widely used for the magnetic disc and the optical disc. As shown in FIGS. 2A and 2B wherein the modulation method of the modified frequency modulation is explained, the data modulated by the MFM method can be obtained in such a manner that a window ab is moved bit by bit as shown in FIG. 2A and two bits corresponding to the data of the window ab are selected from a table shown in FIG. 2B.

FIGS. 3A~3C are schematic views for explaining an operation of the MFM in the normal direction. In this embodiment, parallel data are supplied as 12H, 34H in this order, wherein H shows that the data 12 is a hexadecimal notation. The parallel data 12H are successively converted into serial data from the most significant bit (MSB), and the serial data "00010010" are obtained as shown in FIG. 3B. Then, the serial data are modulated by the MFM method to obtain modulation data shown in FIG. 3C.

FIGS. 4A~4C are schematic views for explaining an operation of the MFM in the reverse direction. In this embodiment, parallel data are supplied as 34H, 12H in the reverse order as that of the normal direction. The parallel data 12H are converted from the least significant bit into the serial data "01001000" as shown in FIG. 4B, and the serial data are modulated by the MFM method illustrated in FIG. 5 to obtain modulation data shown in FIG. 4C. The thus obtained modulation data have the same order as that of the normal direction shown in FIG. 3C if viewed from the right side on the figure.

Figures 5, 6:
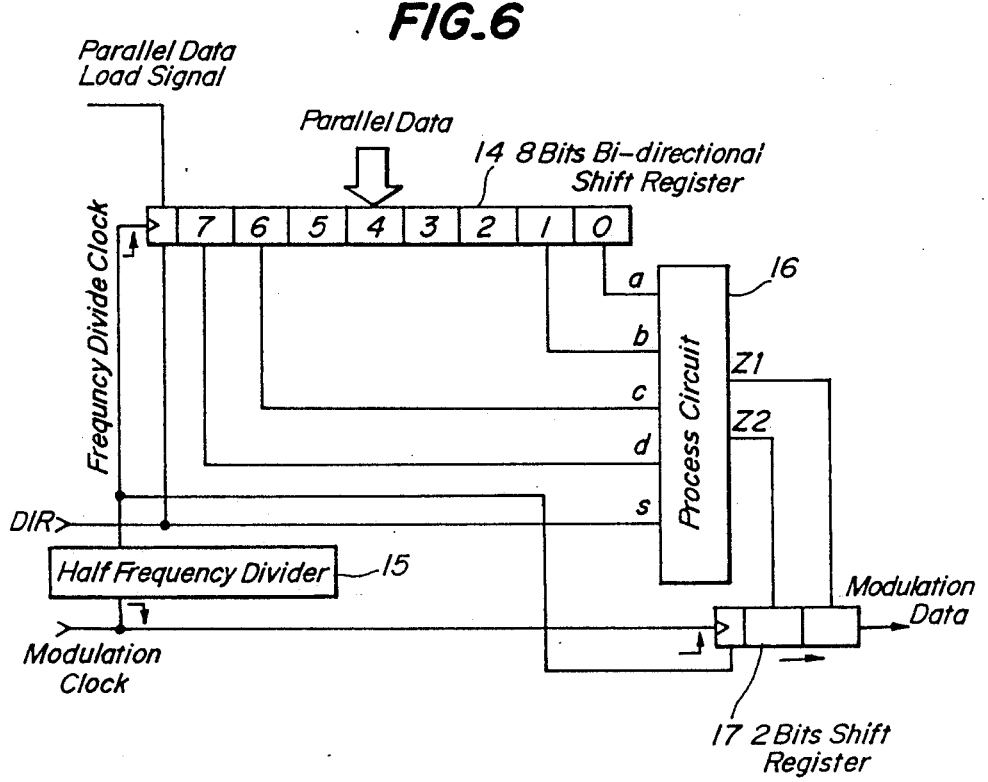
FIG. 5 is a schematic view illustrating an operation of the embodiment illustrated in FIG. 1.
FIG. 6 is a block diagram illustrating one concrete circuit construction of the data recording apparatus shown in FIG. 1.

FIG. 6 shows a concrete circuit construction of the parallel/serial converter 12 and the modulator 13 shown in FIG. 1. In this embodiment, the parallel/serial converter 12 comprises a 8 bits bi-directional shift register 13 and a half frequency divider 15, and the modulator 13 comprises a process circuit 16 and a 2 bits shift register 17. When a parallel data load signal is supplied to the shift register 14, the parallel data are supplied from the buffer memory 11 (FIG. 1) to the bi-directional shift register 14. In this case, it is assumed that a recording direction command signal DIR shows the normal direction when it is "1" and the reverse direction when it is "0". Moreover, the modulation clock is supplied for effecting the half frequency divider 15 at a trailing edge thereof and for shifting the parallel data previously loaded to the bi-directional shift register 14 by one bit at a leading edge thereof. In this case, the shifting operation is performed in a left direction on FIG. 6 when the DIR is "1" and in a right direction on FIG. 6 when the DIR is "0".

Outputs of the 8 bits bi-directional shift register 14 are supplied to a, b, c, d input terminals of the process circuit 16 respectively and are outputted as Z1 and Z2. When the recording operation is performed in the normal direction, use is made of the data supplied to the c, d input terminals, and when the recording operation is performed in the reverse direction, use is made of the data supplied to the a, b input terminals. In the process circuit 16, the processing operation is performed as follows.

$$Z1 = s\overline{cd} + \overline{s}a$$

$$Z2 = sc + \overline{sad}$$

Then, the processed data Z1 and Z2 are supplied to the 2 bits shift register 17 when a frequency divide clock is supplied to the shift register 17 from the half frequency divider 15, and are shifted at the leading edge of the modulation clock to obtain the modulation data. That is to say, when the 8 bits bi-directional shift register 14 is shifted by one bit, the 2 bits shift resister 17 is shifted by two bits.

The modulation data thus obtained are the data modulated by the normal MFM method when the recording operation is performed in the normal direction, and are the data modulated in the same manner as that of the normal direction if readout from the same reading direction as that of the normal direction.

In the embodiment mentioned above, the explanation is performed in the case that the modulation method is the MFM, but it is possible to use the other known modulation method. Moreover, the present invention can be applied for not only the optical card mentioned above but also the other card-like record medium such as the magnetic card.

As mentioned above, according to the invention, since the data recording operation is performed in the manner that the data are recorded in the same order and the same modulation method when viewed from one direction of the relative and reciprocal movement, it is not necessary to use the recording region for the flag used for the detection of the recording direction, and thus the record medium can be utilized effectively. Moreover, since it is not necessary to use a circuit for recording the flag and a circuit for detecting the flag on the data reading operation, the data reading apparatus can be made inexpensive in cost. Further, since the detection error of the flag does not occur, the data can be always readout in an accurate manner, and thus the reliability of the reading operation can be improved.

What is claimed is:

1. A method of recording data on a card-like record medium by moving the card-like record medium reciprocally in normal and reverse directions with respect to a recording head, comprising:
   recording data in the normal direction, comprising the steps of:
   (i) modulating data to be recorded in the normal direction in accordance with a predetermined modulation method using a first conversion table to produce first modulated data; and
   (ii) writing the first modulated data in the normal direction on said card-like record medium; and
   recording data in the reverse direction, comprising the steps of:
   (i) reversing the order of data to produce reverse data;
   (ii) modulating the reverse data to be recorded in the reverse direction in accordance with the predetermined modulation method using a second conversion table to produce second modulated data; and
   (iii) writing the second modulated data in the reverse direction on said card-like record medium, said second conversion table being formed such that said data recorded in the reverse direction is reproducible by demodulating read out data in accordance with said first conversion table, wherein;
   said data is recorded in the normal and reverse directions such that said card-like record medium is reproduced by moving said card-like record medium in either the normal or reverse direction.

2. The method of claim 1, wherein said card-like record medium is an optical card.

3. The method of claim 1, wherein said modulation method is a modified frequency modulation method.

4. The method of claim 1, wherein parallel data in a buffer memory is read out in accordance with the data recording direction and is supplied to a parallel/serial converter to obtain serial data in accordance with the data recording direction.

5. The method of claim 4, wherein said parallel data is processed in the parallel/serial converter one byte at a time.

6. The method of claim 4, wherein said modulation is performed from a most significant bit in the normal direction and from a least significant bit in the reverse direction.

* * * * *